US010831585B2

(12) United States Patent
Gu (10) Patent No.: US 10,831,585 B2
(45) Date of Patent: Nov. 10, 2020

(54) SYSTEM AND METHOD FOR ONLINE UNSUPERVISED EVENT PATTERN EXTRACTION AND HOLISTIC ROOT CAUSE ANALYSIS FOR DISTRIBUTED SYSTEMS (71) Applicant: Xiaohui Gu, Raleigh, NC (US)

(72) Inventor: Xiaohui Gu, Raleigh, NC (US)

( * ) Notice: Subject to any disclaimer, the term of this patent is extended or adjusted under 35 U.S.C. 154(b) by 156 days.

(21) Appl. No.: 15/937,362

(22) Filed: Mar. 27, 2018

(65) Prior Publication Data
US 2019/0324831 A1    Oct. 24, 2019

Related U.S. Application Data

(60) Provisional application No. 62/477,981, filed on Mar. 28, 2017.

(51) Int. Cl.
*G06F 11/00* (2006.01)
*G06F 11/07* (2006.01)
*G06N 20/00* (2019.01)

(52) U.S. Cl.
CPC ........ *G06F 11/079* (2013.01); *G06F 11/0709* (2013.01); *G06F 11/0751* (2013.01); *G06F 11/0769* (2013.01); *G06F 11/0793* (2013.01); *G06N 20/00* (2019.01)

(58) Field of Classification Search
CPC ............. G06F 11/0709; G06F 11/0751; G06F 11/079; G06F 11/0793; G06F 11/36–3616; G06F 11/3636; G06F 11/3664; G06F 11/3668–3692; G06F 16/20; G06F 16/285; G06F 16/30; G06F 16/35; G06N 20/00; G06N 3/088; G06N 3/10; H04L 41/16

See application file for complete search history.

(56) References Cited

U.S. PATENT DOCUMENTS

| | | | | |
|---|---|---|---|---|
| 8,024,618 B1 * | 9/2011 | Margolis | ............ | G06F 11/0727 714/43 |
| 9,069,737 B1 * | 6/2015 | Kimotho | ............ | G06F 11/1484 |
| 9,632,914 B2 * | 4/2017 | Cheng | ................. | G06F 11/3644 |
| 10,067,813 B2 * | 9/2018 | An | .......................... | G06F 11/34 |
| 10,122,605 B2 * | 11/2018 | Kulkarni | ............. | H04L 43/0817 |

(Continued)

*Primary Examiner* — Michael Maskulinski
(74) *Attorney, Agent, or Firm* — John L. Sotomayor (57) ABSTRACT

An unsupervised pattern extraction system and method for extracting user interested patterns from various kinds of data such as system-level metric values, system call traces, and semi-structured or free form text log data and performing holistic root cause analysis for distributed systems. The distributed system includes a plurality of computer machines or smart devices. The system consists of both real time data collection and analytics functions. The analytics functions automatically extract event patterns and recognize recurrent events in real time by analyzing collected data streams from different sources. A root cause analysis component analyzes the extracted events and identifies both correlation and causality relationships among different components to pinpoint root cause of a networked-system anomaly. Furthermore, an anomaly impact prediction component estimates the impact scope of the detected anomaly and raises early alarms about impending service outages or application performance degradations based on the identified correlation and causality relationships.

14 Claims, 6 Drawing Sheets

(56) References Cited

U.S. PATENT DOCUMENTS

| | | | |
|---|---|---|---|
| 2006/0288261 A1* | 12/2006 | Yuan | G06F 11/0715 714/48 |
| 2010/0100774 A1* | 4/2010 | Ding | G06F 11/3636 714/45 |
| 2010/0122270 A1* | 5/2010 | Lin | G06F 11/3006 719/318 |
| 2011/0154109 A1* | 6/2011 | Levine | G06F 8/70 714/26 |
| 2016/0196174 A1* | 7/2016 | Jacob | G06F 11/0781 714/37 |
| 2016/0350173 A1* | 12/2016 | Ahad | G06F 11/0751 |
| 2018/0115464 A1* | 4/2018 | Fighel | H04L 41/0654 |
| 2018/0203757 A1* | 7/2018 | Akune | G06F 11/079 |
| 2019/0334759 A1* | 10/2019 | Ray | H04L 43/04 |

* cited by examiner

SYSTEM AND METHOD FOR ONLINE UNSUPERVISED EVENT PATTERN EXTRACTION AND HOLISTIC ROOT CAUSE ANALYSIS FOR DISTRIBUTED SYSTEMS

PRIORITY CLAIM

This Non-Provisional application claims priority to Provisional Application 62/477,981, filed Mar. 28, 2017, and Titled "System and Method for Online Unsupervised Event Pattern Extraction and Holistic Root Cause Analysis for Distributed Systems".

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

As computer systems become increasingly complex, computer system anomalies become more prevalent, causing serious performance degradations, service outages, and, ultimately, big financial loss and brand damages. To handle the anomalies, system managers wish to receive early alerts, root cause analysis, and remedy suggestions to minimize the system downtime.

To date, existing solutions have mostly focused on detecting anomalous metric values. However, it is difficult for the system manager to understand enormous amounts of low-level anomalous raw data and manually extract meaningful insights or patterns from those many anomalous raw data. Moreover, existing techniques typically analyze system anomalies within individual components. However, production computing infrastructures often consist of many interdependent components. One component anomaly may cause other components to fail and eventually bring down the whole production system. Thus, it is important to understand which groups of components have strong causal relationships among their failure incidents.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to "component" refers to computers, servers, communication devices, displays, diagnostic devices, software modules, software utilities, application programming interfaces (APIs), and all other devices and modules having a network communication connection permitting each component to be connected to one or more networked systems.

Reference throughout this document to an "adaptive pattern learning algorithm" refers to the development and use of automatic learning algorithms to extract one or more association patterns from individual component events.

Reference throughout this document to a "pattern label" refers to the creation of a label for a discovered pattern based upon the top contributing metrics and log keywords that are associated with a detected anomaly pattern through the use of unsupervised machine learning methods.

Reference throughout this document to a "cascade event" refers to a condition where if a correlation probability between components is at or near 1.0, the components can be said to be highly correlated in such a way that if one component is affected by an anomaly highly correlated components are highly likely to be affected as well creating a cascade of events from one component to all components that are highly correlated with that one component.

Reference throughout this document to "Key Performance Indicator (KPI)" refers to a metric, measurement, value, valuation, or statistic in which a user has high confidence that the KPI is representative of the performance of a particular network, component, software module, or other system component.

In an embodiment, the present invention relates to unsupervised online event pattern extraction and holistic root cause analysis in distributed systems. In a non-limiting example, the invention is implemented in public and private cloud environments.

In an embodiment, the innovation may first perform metric event pattern extraction. In this embodiment, the innovation first provides automatic unsupervised multi-variant statistical classification methods to extract principle event patterns from large amounts of raw metric data streams for a system under analysis. Each event pattern captures a unique system state. A modern server system typically operates under different states over time because of environment changes such as workload fluctuations, resource allocation change, software updates, or other actions required to meet processing load, system updates, or other maintenance and operational needs. In this embodiment, the system may capture all unique system states of a live production server using unsupervised online learning algorithms.

In an exemplary embodiment, the innovation may further identify key features of each event pattern to automatically create a label for each event pattern. This pattern label is created through the use of unsupervised machine learning methods. In a non-limiting example, if the innovation identifies the key metrics that make an event pattern unique are the result of a gradually increasing memory consumption and a near constant CPU usage, these metrics are captured when the machine has learned to categorize this event as a "memory leak," a pattern label is created for this event, and the event is labeled and stored under the created pattern label. A user may override or edit the pattern label using domain knowledge that is specific to the domain in which the system under analysis is operational.

In an embodiment, the innovation may also automatically identify recurrent event patterns by comparing newly extracted patterns with previously captured and stored patterns. As a byproduct of the event pattern extraction service, the innovation may also provide data compression benefit to the user by only storing unique patterns. This operation avoids duplication and promotes more efficient storage of patterns and optimizes search time when recalling event patterns for analysis or comparison. To further simplify the event browsing for the user, the innovation may further aggregate continuous events of the same pattern into one consolidated event.

In an embodiment, the innovation may next perform operations to permit the extraction from log files of event patterns. In addition to metric data, many customers already collect large amounts of log data through the operation of existing log collections and search tools such as ELK and Splunk. Log data provides useful information especially for anomaly diagnosis. Existing log analysis tools focus on providing search and query support with little support for automatic pattern extraction. Different from metric data, log data are semi-structured or unstructured. In order to apply statistical machine learning algorithms to extract patterns from the accumulated log data, the innovation may first extract quantitative features from the raw log data. In this embodiment, the innovation implements two schemes to address the issue of extracting quantitative features from raw log data. The first approach is to extract popular keywords from all the log events and use the frequency of keywords to construct the feature vector for each log event. The innovation may also provide word filtering functions for the user to filter out uninteresting words such as articles, verbs, and adjectives. In the second approach, the innovation may further extract popular phrases, where the popularity of a phrase is based upon the number of times the phrase appears in the incoming log data, using a frequent episode mining algorithm. The innovation may then construct frequency feature vectors in a similar manner as constructing word frequency vectors. The innovation may also provide a user interface for the user to conveniently choose the interesting keywords and phrases he or she prefers to use in the analysis algorithm.

In an embodiment, after extracting feature vectors from raw log data, the innovation may apply unsupervised machine learning algorithms over extracted feature vectors to group log data with similar feature patterns together. This log pattern extraction service can help users browse through a large number of log events and extract useful information in a more efficient way. Moreover, this classification can be useful for incident triage by helping a user to identify previously diagnosed events. The innovation may also achieve log data compression by identifying common parts among similar log data and replacing common parts with a pattern identifier to eliminate duplicate log data and optimize the storage of data within the log files.

In an embodiment, in addition to log event classification, the innovation may also perform rare event identification by identifying those log data patterns that rarely appear in the analyzed log data. A histogram may be created to present to a user those event patterns that appear more or less frequently, or appear in an unusual way.

In an embodiment, the innovation is operative to perform system call trace pattern extraction for the system under analysis. The system call trace pattern extraction receives analysis data from system call traces and function call traces to create a set of system call sequence patterns for application functions called. This data may be used to extract patterns for system call traces that have been affected by some anomaly. The system call sequence pattern extraction may be used to develop a list of affected functions that may be reported to a user.

In an embodiment, the innovation is operative to create an adaptive pattern learning framework. Modern computer systems are highly complex and dynamic, especially for emerging container-based architectures where application components can be dynamically created and deleted with high frequency. The innovation may provide an adaptive pattern learning framework that can accommodate both environment changes (in the form of workload changes, resource availability variations, and other environment changes) and different kinds of applications such as long-running batch jobs in comparison with short-running tasks.

In an embodiment, the innovation provides for associative event analysis to further develop automatic learning algorithms to extract the association patterns from individual component events. The event association algorithms extract possible correlation and causality relationships among different system components based on the start time of different events. A cascade of components affected by events may be discovered through a correlation of the relationships between various components in the system. A sequence of relationships between components may be constructed and the correlations applied to determine all possible cascade sequences for components that are highly correlated in the event of a system anomaly affecting any component within the sequence of relationships.

In an embodiment, proper system orchestration services such as auto-scaling, migration, and/or reboot may be automatically triggered by matching a detected or predicted event with stored anomaly pattern to automatically repair an unhealthy system as an automatic fix. The system manager can configure the orchestration functions based on different extracted event patterns. In a non-limiting example, if the event is recognized as a memory leak bug, an autofix action could be configured. The autofix action could be specified to require rebooting the software to prevent the system outage and alert the developer to patch the memory leak. If the detected event type is network congestion, migration actions may be undertaken to avoid the impact of bandwidth shortage. By automatically identifying different event patterns, the innovation allows the system manager to configure proper autofix actions to be triggered automatically without human intervention.

In an embodiment, the system for computerized network anomaly prediction and correction may consist of a processor in networked data communication with a plurality of networked components and a plurality of software components. Including a software module operative to capture unique system status of one or more network production servers through the use of unsupervised learning algorithms where pluralities of networked components are transmitting at least metric data, system call trace data and log data to the system processor.

Additionally including a software module operative to label one or more system conditions that correspond to the metric data values that contribute to an identified anomaly pattern as defined by a system user, where the event labels may be edited or over-ridden by a human user with specific domain knowledge. The system may use said metric data, system call trace data, and log data to create one or more anomaly events associated with said anomaly pattern, where each identified anomaly pattern is given a label automatically that can be further refined by a human user. The system may aggregate two or more events having substantially the same event pattern into a consolidated event and analyze said anomaly events utilizing causal and correlation relationships between said pluralities of networked components for extracting root causes of a detected or predicted anomaly event.

The system may extract one or more patterns from said system call trace data to develop a list of affected functions to be reported to a user. Upon such identification, the system may utilize system user defined orchestration functions to trigger autofix functions for said events, where said autofix functions correct said one or more events, reporting autofix actions, and providing predictions and recommendations for additional corrective action to a system user.

Figure 1:
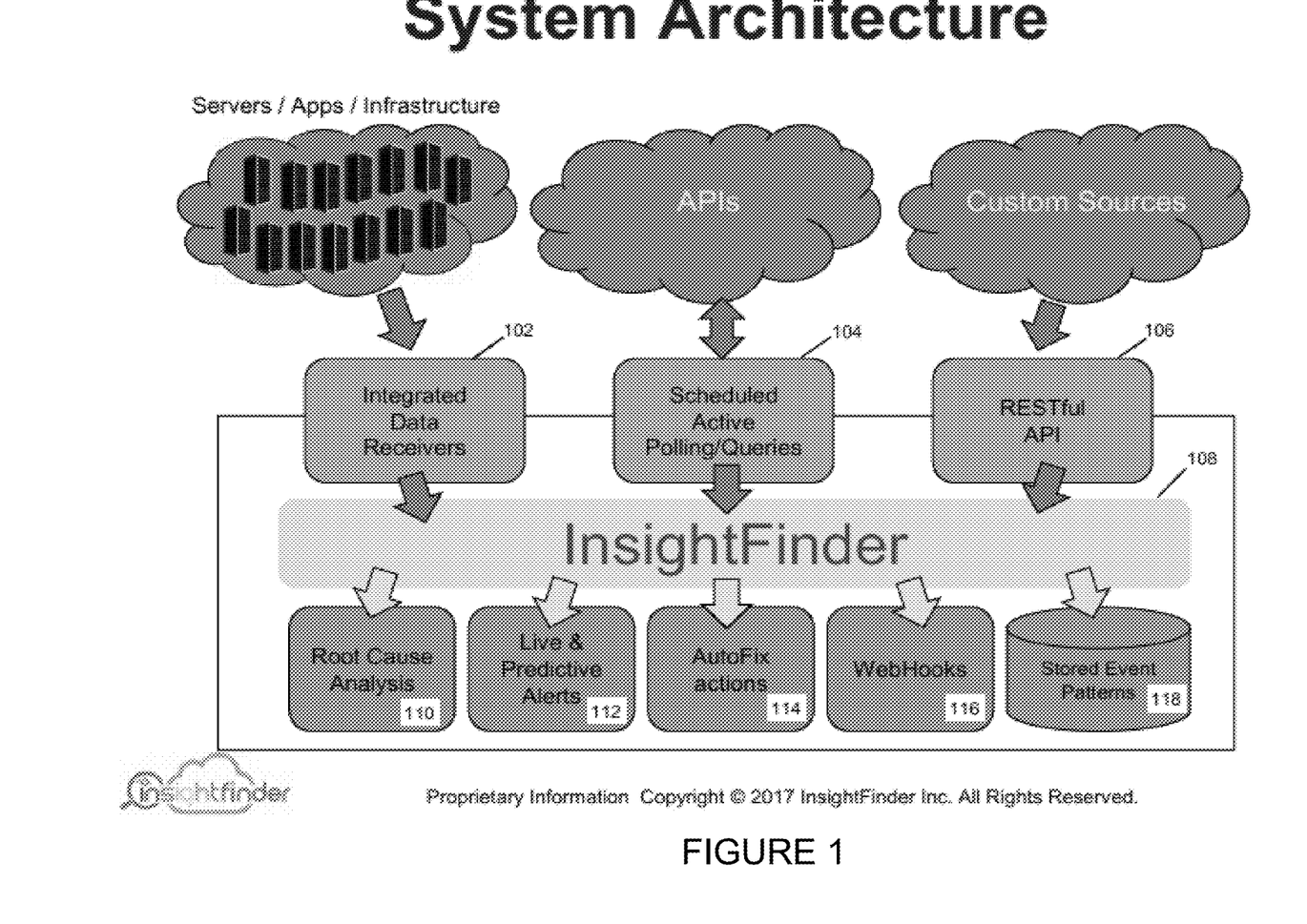
FIG. 1 is a view of the system architecture to perform pattern extraction and relationship extraction consistent with certain embodiments of the present invention.

Turning now to FIG. 1, this figure presents a view of the system architecture to perform pattern extraction and relationship extraction consistent with certain embodiments of the present invention. In an exemplary embodiment, the innovation first provides automatic unsupervised multi-variant statistical classification methods to extract principle event patterns from large amounts of raw metric data streams for a system under analysis. The extracted event patterns may be labeled by the system to provide readily available identifiers for each event pattern. The system architecture provides for ingestion of events and data from data receivers integrated 102 into the system such as events received from independent and cloud-based servers, apps active on mobile devices, and infrastructure components. Additional ingestion may be received from Application Programming Interfaces (APIs) from scheduled active polling and/or queries 104 and Custom Sources such as the RESTful API 106. Event, log, and other data patterns are received from all sources by the Insightfinder application 108.

In an embodiment, each event pattern captures a unique system state. In this embodiment, the system may capture all unique system states of a live production server using unsupervised online learning algorithms. The Insightfinder application 108 performs trained extraction, anomaly detection, and component actions to create output that is meaningful to a user. The Insightfinder application provides root cause analysis 110, provides live and predictive alerts 112 for discovered anomalies, provides autofix actions 114 for known anomalies and/or issues, provides webhooks 116 for further information discovery and problem correction, and provides for stored event patterns 118 to optimize future discovery and correction of problem events, anomalies, and issues.

Figure 2:
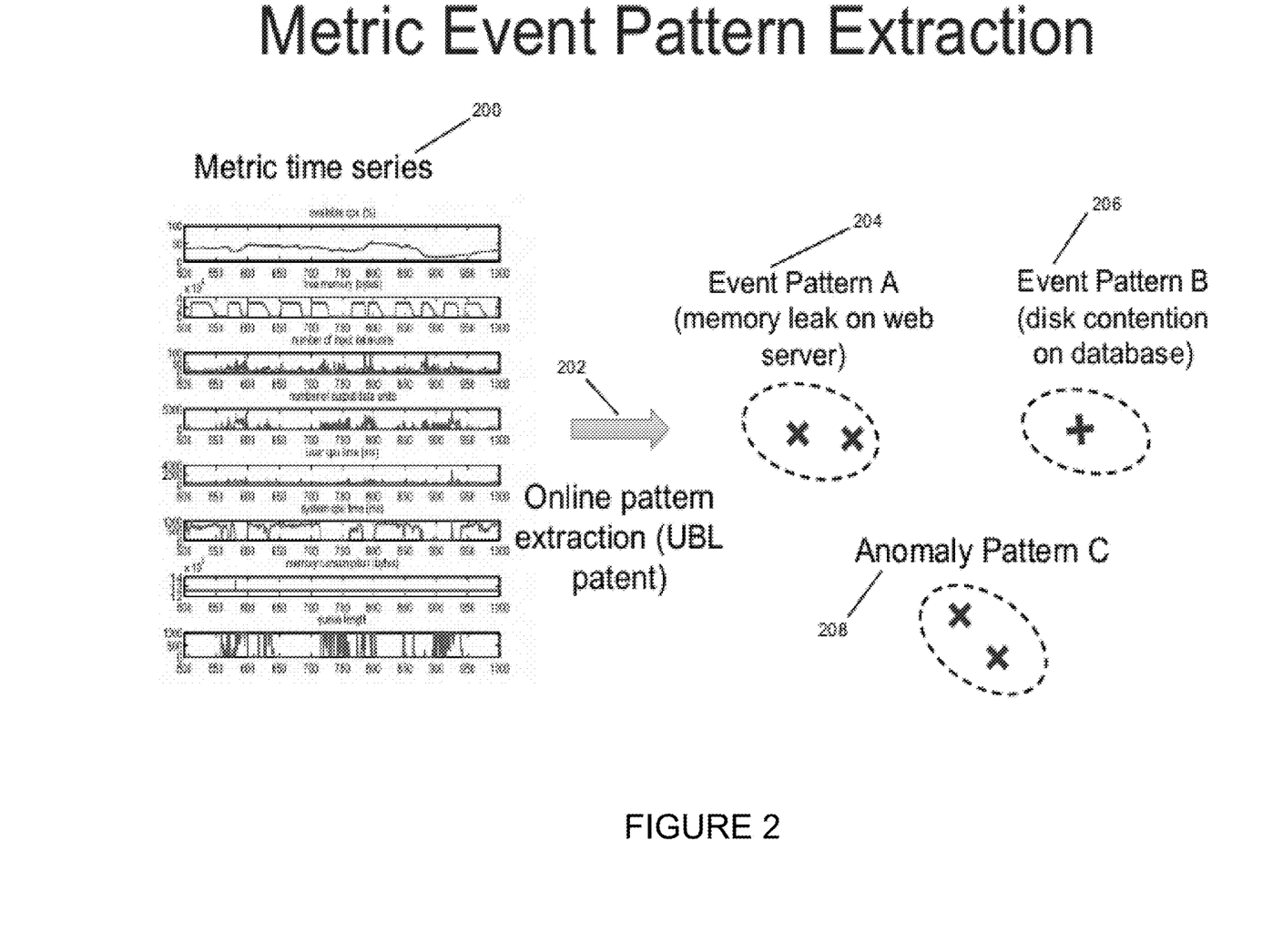
FIG. 2 is a view of metric event pattern extraction consistent with certain embodiments of the present invention.

Turning now to FIG. 2, this figure presents a view of metric event pattern extraction consistent with certain embodiments of the present invention. In an exemplary embodiment, the system presents the operation for metric event pattern extraction utilizing incoming data values from a plurality of sources such as, but not limited to, data receivers, APIs and custom sources. Input data may be composed of a series of parameters that are ingested as metric time series event data 200. The metric time series data 200 may, by way of example and not of limitation, be composed of a time span snapshot of available cpu percentage over time, the amount of free memory in mega-bytes, the number of input data units, the amount of cpu time consumed by users in milliseconds, the amount of cpu time consumed by the system in milliseconds, total memory consumption in mega-bytes, and the overall queue length for jobs in process, among other parameters that may be specified by the system as such additional parameters are identified. The system may have a software module operative to perform online pattern extraction 202 from the input metric time series data input to the system.

In an embodiment, the online pattern extraction process may discover a pattern, entitled Event Pattern A 204, that is indicative of a memory leak on a web server. As previously described, Event Pattern A 204 may be established through a unique event pattern that is the result of gradually increasing memory consumption and a near constant CPU usage, the system may create a label a "memory leak" for this event pattern such as, in a non-limiting example, Event Pattern A 204. Similarly, metric values that indicate that there is disk contention on a database within the purview of the received metric time series values may be labeled by the system such as, in a non-limiting example, Event Pattern B 206.

In an embodiment, metric time series values that have not previously been received, or produce a pattern that is not yet known to the system may result in an Anomaly branding by the system such as is labeled and represented by Anomaly Pattern C 208. Anomaly Pattern C 208 may occur again on a frequent or intermittent basis, however, the system is operative to store Anomaly Pattern C 208 in a pattern database utilizing the event pattern label established by the system. This permits the system to recall Anomaly Pattern C 208, among other stored patterns, whenever the same pattern is presented by the Online Pattern Extraction process 202. As anomalies are discovered and labeled with the system condition that corresponds to the metric data values that contribute to the identified anomaly pattern, either by the user or administrator of the system or by the system, the system may replace the anomaly term with the identified system condition and rename the anomaly pattern with said system condition. In this manner, the system may learn to recognize anomalous conditions and provide proper labels and recommendations for such patterns.

Figure 3:
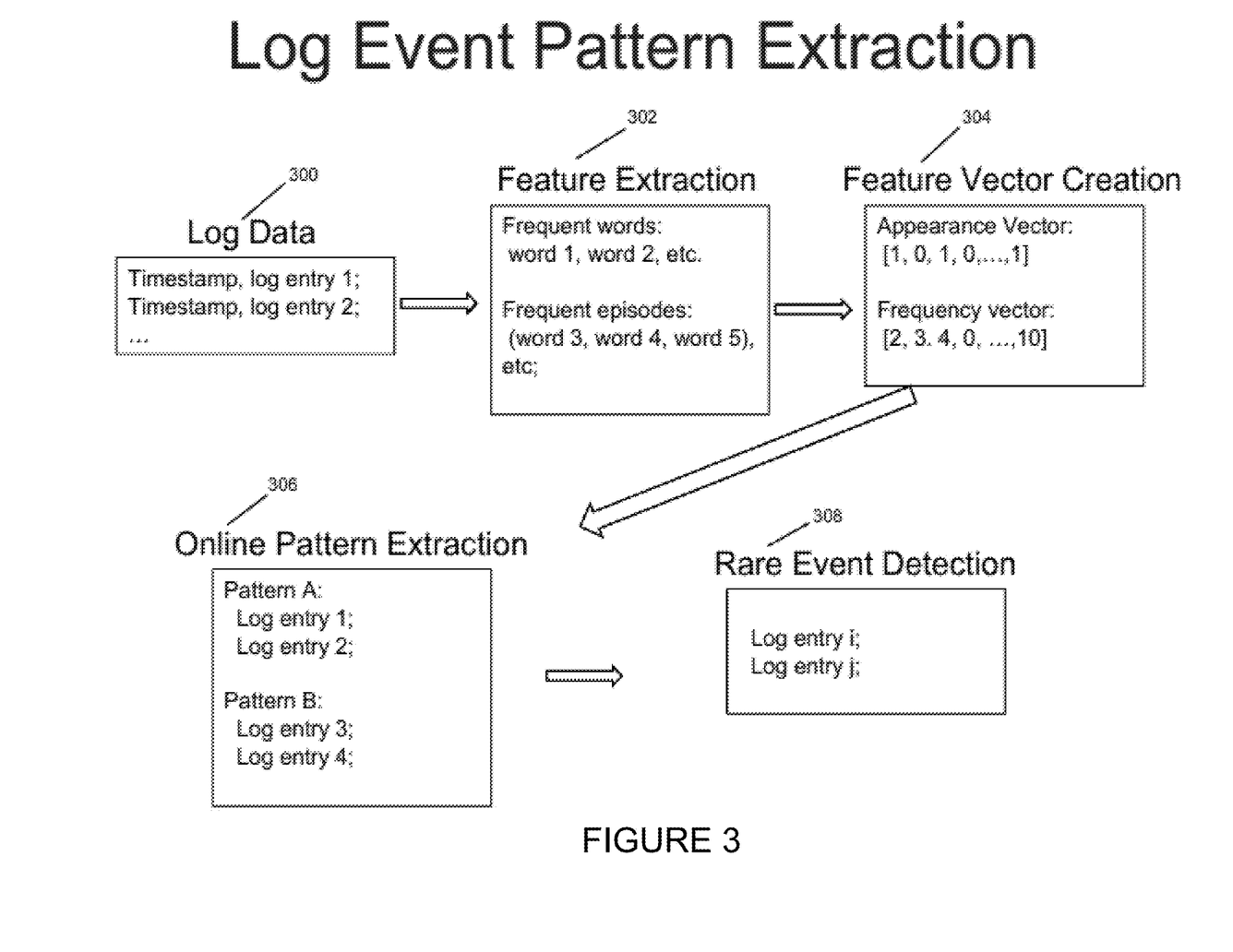
FIG. 3 is a view of log event pattern extraction consistent with certain embodiments of the present invention.

Turning now to FIG. 3, this figure presents a view of log event pattern extraction consistent with certain embodiments of the present invention. In an exemplary embodiment, the system does not depend solely upon patterns extracted from metric time series input to perform analysis and identify patterns indicating events that may require remediation. The system also receives collected log data that may be semi-structured or unstructured to provide additional verification for patterns possibly requiring remediation. The received log data 300 is subjected to statistical machine learning algorithms to extract patterns from those data. Feature extraction 302 from the log data uses two principal schemes to analyze the received log data 300. The system may extract frequently used, or popular, words from the received log data 300. The system also determines the frequency of use for each popular word. When extracting frequently used words a word filtering function is employed to filter out uninteresting words such as articles, verbs, and adjectives to reduce the amount of processing time and optimize the extraction of words that may truly be indicative of anomalous patterns. The system may also extract popular phrases using a frequent episode mining algorithm as well as the frequency of occurrence of each popular phrase. The system may also present mined frequently used words and phrases to a user to permit the user to choose the interesting keywords and phrases the user wants the system to use in performing further analysis on the log data.

In an embodiment, the system may utilize the occurrences of popular words and popular phrases in combination with the frequency of occurrence of each popular word and/or phrase to construct frequency feature vectors 304. The frequency feature vectors may be composed of an appearance vector for each appearance of a particular word or phrase, and a frequency vector for the number of times each popular word or phrase occurs in the received log data 300. After the creation of the frequency feature vectors has been completed, the innovation may apply unsupervised machine learning algorithms over extracted feature vectors to group log data with similar feature patterns together to perform online pattern extraction 306. This online pattern extraction service 306 as applied to received log data 300 can help users browse through a large number of log events and extract useful information in a more efficient way. Moreover, this classification can be useful for incident triage by helping a user to identify previously diagnosed events.

In an embodiment, the system may utilize the extracted patterns to perform rare event detection 308 from the received log data 300. Rare log events may indicate some interesting incidents, which could expedite the incident triage processing by giving the rare patterns higher processing priority. The innovation may also compute a windowed frequency count for each extracted log pattern and construct a histogram chart for each pattern. In a non-limiting example, if the log pattern A appeared 5 times in [0, W] and 10 times in [W+1, 2×W], the system may produce a histogram of [5,10]. The innovation may then perform anomaly detection over the histogram to detect which event patterns appear more or less frequently in an unusual way. The histogram may provide a user with a view of event patterns that are of interest to the user, how frequently such patterns occur, and may provide the user with the ability to select particular words or phrases for additional analysis and processing.

Figure 4:
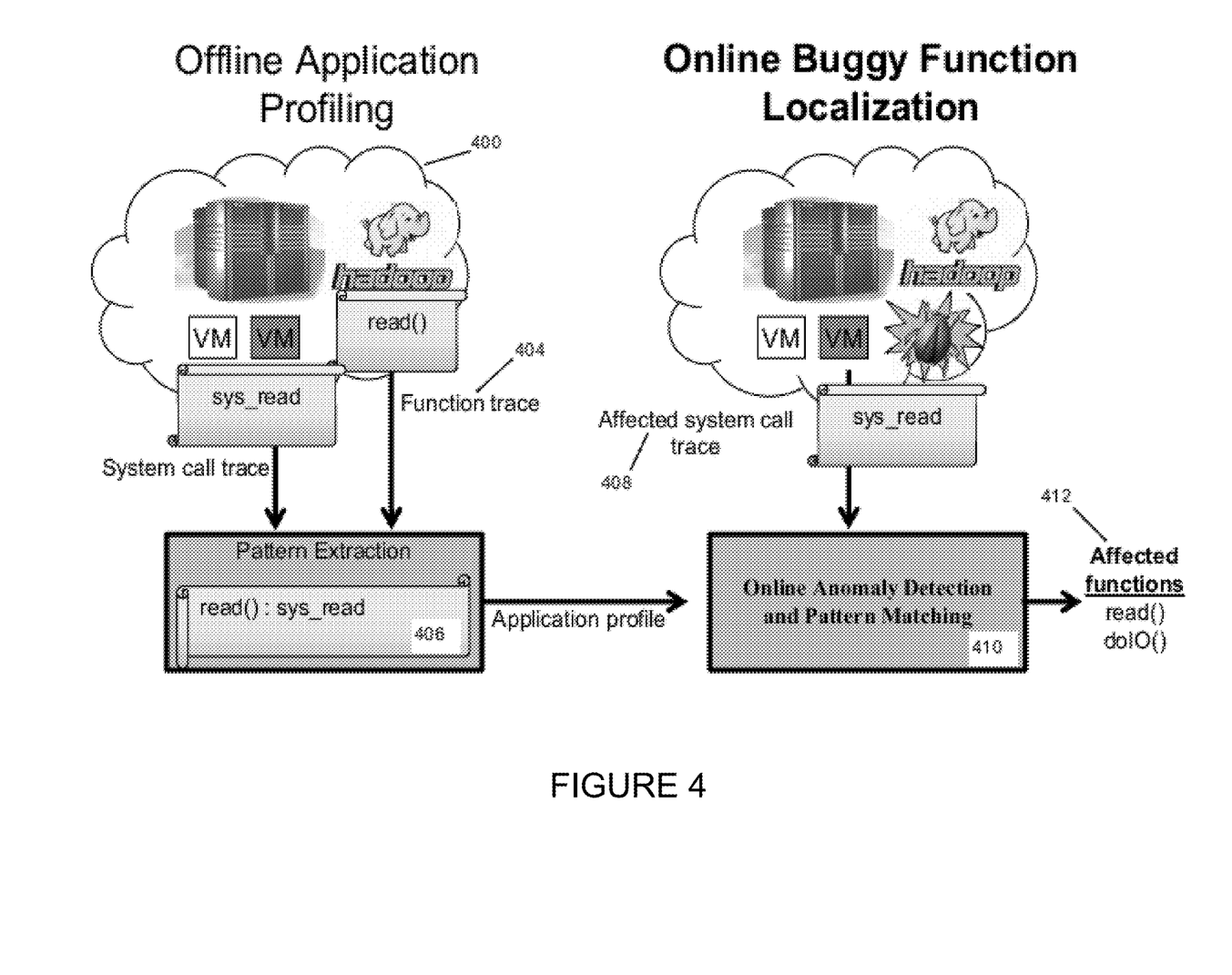
FIG. 4 is a view of system call trace anomaly detection and pattern matching consistent with certain embodiments of the present invention.

Turning now to FIG. 4, this figure presents a view of call trace anomaly detection and pattern matching consistent with certain embodiments of the present invention. In an exemplary embodiment, in addition to metric and log data, the innovation may also provide system call tracing function 400 that can collect runtime system call traces for production server applications. The innovation may first perform simple pre-processing to extract system call information in the form of (timestamp, process ID, thread ID, system call type). The innovation may then segment the large raw system call traces into smaller groups of related system calls that are termed execution units based on process identifier, thread identifier, and the time gap between two continuous system calls 402. The innovation may next perform frequent episode mining over the system call trace within each execution unit to identify common system call sequences to trace functions that are frequently called and the frequency with which such functions are called 404. The system call trace and function trace analysis contribute to the pattern extraction 406 to disclose functions that display indicators of being affected in some way that may require intervention.

In an embodiment, the innovation may also perform an affected system call trace detection 408 action in each execution unit to identify which system calls are either executed more frequently or take longer time to execute within each execution unit to determine which functions require further processing. The innovation may then label each execution unit as normal or abnormal based on the anomaly detection results in comparison with the system call execution time or frequency. The innovation may also map each execution unit to high level program constructs such as application functions by profiling the frequent system call episodes produced by different application functions.

An online anomaly detection and pattern matching 410 module receives the extracted patterns from the system call trace 402 and function trace 404 operations. The patterns provide information regarding the affected system calls as identified by the analysis of the system calls and operative functions. The online anomaly detection and pattern matching 410 module may provide an adaptive pattern learning framework that can accommodate both environment changes and different kinds of applications such as long-running batch jobs in comparison with short-running tasks. At a high level, each pattern is a compressed representation of one specific system state and each model we create consists of all possible patterns of the behavior of the system being analyzed over a period of time (e.g., one day) for each system component. The innovation may then take a model ensemble approach to building a group of models for each system component where each system component could be any of a job, a task, a micro-service, or any other identified system component.

In an embodiment, the learning framework expressed by the innovation is adaptive with regard to both dynamic environments and application component types. Initially, the innovation may adopt different sampling rate for deriving models for different application components. In a non-limiting example, for long-running jobs, the innovation may employ a relatively long sampling period (e.g., 5 minutes) for pattern extraction. However, for short-running tasks, preferably a fine grained sampling period is utilized (e.g., 1 second) for pattern extraction. The innovation may then perform dynamic model consolidations to improve the model quality for each application component. The innovation aggregates the training data coming from multiple similar tasks or jobs to train one consolidated model instead of creating a set of separate models trained from segmented data. Performing this operation is particularly important for short-running tasks which often just exist for a few minutes, which will result in an insufficiently trained model. The result of the online anomaly detection and pattern matching function is a set of affected functions 412 for the system under analysis.

Figure 5:
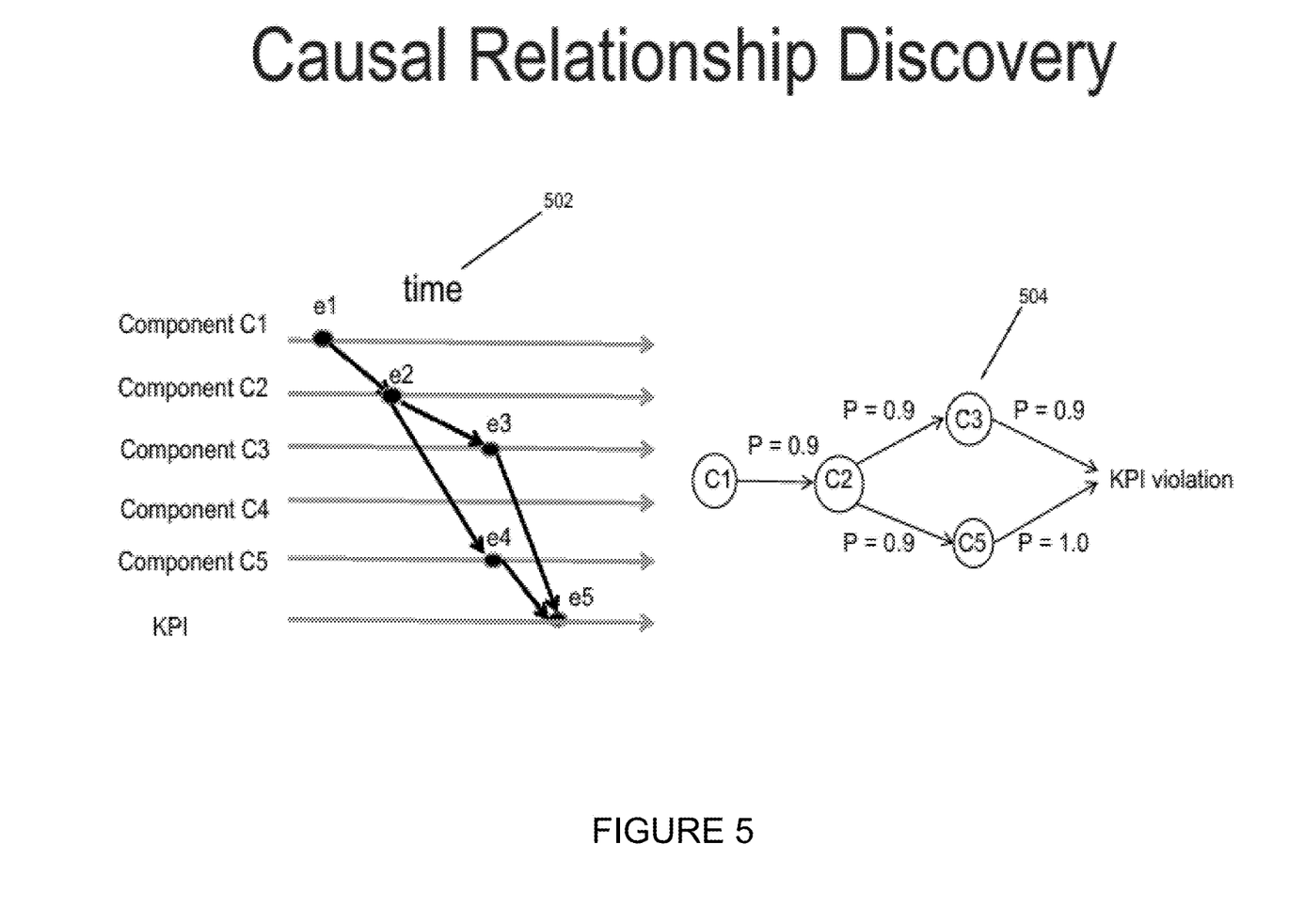
FIG. 5 is a view of component causal relationship discovery consistent with certain embodiments of the present invention.

Turning now to FIG. 5, this figure presents a view of component causal relationship discovery consistent with certain embodiments of the present invention. In this embodiment, the event association algorithms extract possible correlation and causality relationships among different system components based on the start time of different events 502. Two components C1 and C2 are said to be correlated if anomalous events often occur on both components concurrently. Two components C1 and C2 are said to have causal relationships if anomalous events on C1 often happen before anomalous event on C2. In a non-limiting example, if database DB always starts to experience anomalies a few minutes after the web server WS has some issues, the inference is that there exists a possible causal relationship between DB and WS.

In an embodiment, based on the extracted events from metric data, log data, and system call trace data, holistic root cause analysis may be performed to reveal the reason why a problem occurs in the production system. Specifically, the root cause analysis tool may identify the exact host(s), system metric(s), application component(s), and buggy function(s) attributed to a production system problem. The root cause analysis executes an automatic drill down root cause analysis protocol to gradually narrow down the location of the root cause hosts, components, and application functions in a distributed system. When an abnormal metric pattern is detected, a log and system call trace analysis may be triggered to detect whether there exists any abnormalities in log and system call trace data to further pin down the root causes. In a non-limiting example, it can be distinguished whether the root cause comes from outside or inside the application software. If the root cause is located inside the application software, the buggy application function may be further localized using the system call trace pattern extraction algorithm described above.

In an embodiment, the system may use a set of causality relationships and probabilities of possible correlation to determine common component failure sequences 504. Frequent sequence mining may also be applied to discover common component failing sequences, that is, anomaly on component A "happens before" the anomaly on component B. Since those raw event sequences can be noisy and imprecise, frequent sequence mining may be used to extract strong causality relationships. Additional dependency information may be leveraged, such as network topologies, application structures, and communication patterns, to cross validate the group patterns discovered by the causal relationship algorithms. The cascade of failures among strongly correlated components may provide a determination of one or more Key Performance Indicator (KPI) violations.

Figure 6:
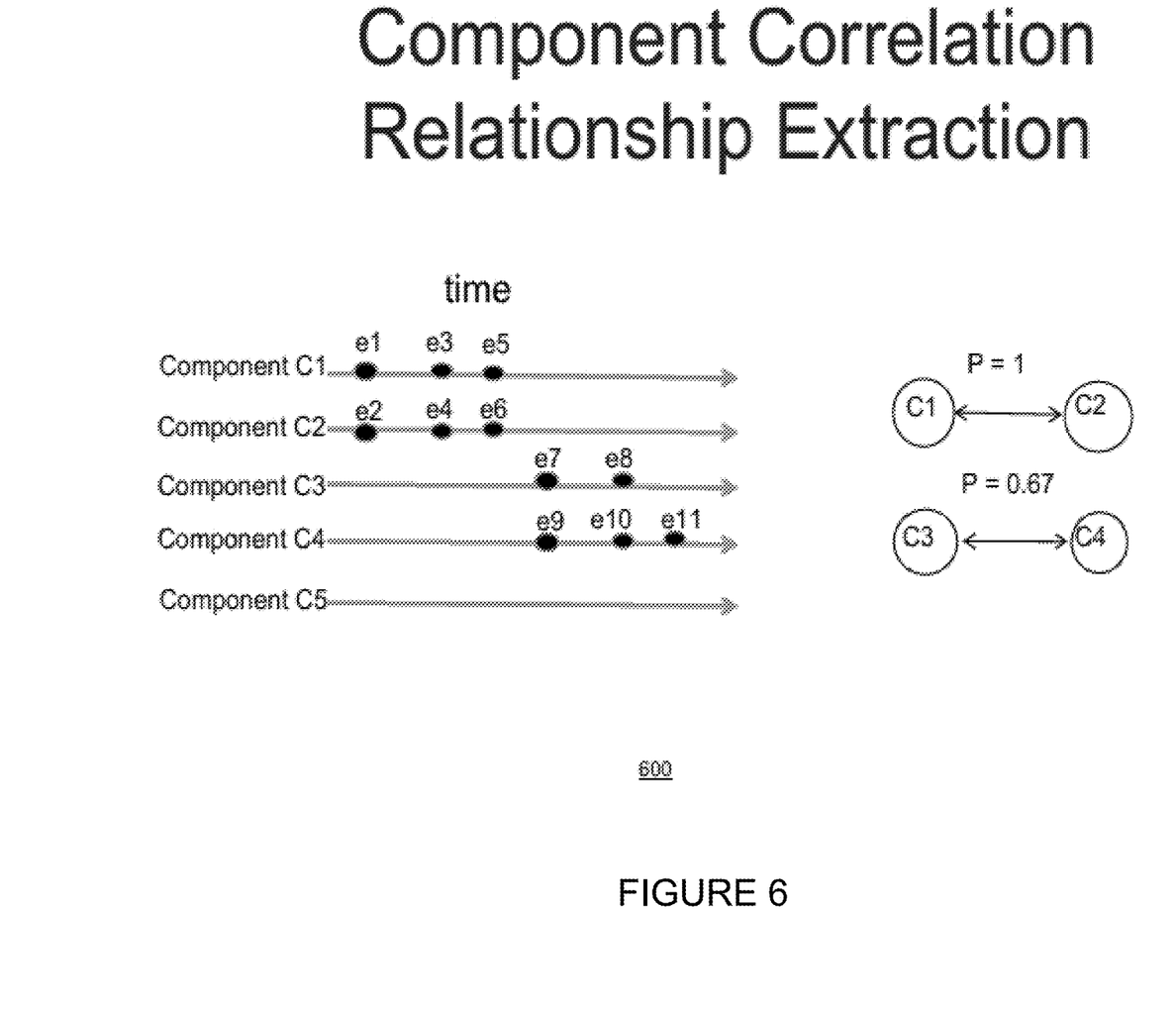
FIG. 6 is a view of component correlation relationship extraction consistent with certain embodiments of the present invention.

Turning now to FIG. 6, this figure presents a view of component correlation relationship extraction consistent with certain embodiments of the present invention.

In this embodiment, holistic performance anomaly impact prediction 600 may be provided to estimate the potential impact of a detected anomaly. Based on the anomaly correlation patterns, a first estimate may be provided as to which other components are likely to become anomalous after detecting one component anomaly. In a non-limiting example, after detecting an anomaly on switch S3 (Component 1), a prediction that edge router R1 (Component 2) will probably fail soon may be made since these components always experience anomalies together. Subsequently, a prediction may be provided regarding which application or service will be likely to experience service outages or key performance indicator (KPI) violations based on the causal relationships between system metrics and KPI violations.

In a non-limiting example, consider a distributed multi-tier application consisting of web service tier and database tier. If an observation that a disk contention anomaly on the database tier is likely to cause a CPU contention on the web server tier, and further a response time increase (e.g., database disk contention—Web CPU spike—KPI violation), early alarms may be raised about any web server anomaly and KPI violation when a database anomaly is detected. Thus, the technique herein recited can achieve early performance problem detection by leveraging causality analysis results.

While certain illustrative embodiments have been described, it is evident that many alternatives, modifications, permutations and variations will become apparent to those skilled in the art in light of the foregoing description.

I claim:

1. A system for anomaly pattern recognition and root cause analysis in distributed systems, comprising:
   a processor in networked data communication with a plurality of networked heterogeneous and/or homogeneous components;
   said processor capturing from said plurality of networked components at least metric data, system call trace data, and/or log entry data at said processor;
   said processor processing said metric data, system call trace data, and/or log entry data to detect one or more anomaly events and extract anomaly patterns using unsupervised machine learning algorithms;
   said processor creating at least one label for each anomaly event and anomaly pattern via unsupervised machine learning algorithms where the labels may be edited or over-ridden by a human user with specific domain knowledge:
   said processor identifying causal relationships between said plurality of networked components;
   said processor analyzing said anomaly events utilizing automatically identified and/or user identified causal relationships between said plurality of networked components for identifying one or more root cause metrics, system call sequences, and/or log entries, and associated components;
   said processor utilizing an identified anomaly pattern to trigger autofix functions, where said autofix functions correct said one or more anomalies associated with an identified anomaly pattern; and
   said processor reporting autofix actions to a system user.

2. The system of claim 1, further comprising said processor detecting a system condition that characterizes a previously known or unknown identified anomaly pattern.

3. The system of claim 1, further comprising discovery of one or more anomaly events by said processor where said anomaly events discovered by said processor are cascading events spanning different types of components.

4. The system of claim 1, further comprising said processor aggregating two or more contiguous events having the same event patterns into a consolidated event.

5. The system of claim 1, further comprising said processor extracting log event patterns from received log data and constructing a feature vector for each log entry contained within said received log data.

6. The system of claim 5, further comprising said processor creating frequent episode feature vectors and word frequency vectors for each log entry contained within said received log data.

7. The system of claim 1, further comprising said processor extracting one or more patterns from said system call trace data to identify a ranked list of affected functions to be reported to a user.

8. A method for networked component anomaly pattern recognition and correction, comprising:
   communicating with a plurality of networked heterogeneous or homogeneous components;
   capturing a unique system status of one or more network production servers through the use of unsupervised machine learning algorithms;
   the plurality of networked components transmitting at least metric data, system call trace data and log entry data to said processor;
   processing said metric data, system call trace data, and/or log entry data to detect one or more anomaly events and extract anomaly patterns and creating at least one label for each anomaly pattern and anomaly event, where each identified anomaly pattern and anomaly event is given a label that is produced by said unsupervised machine learning algorithms, and where said event labels may be edited or over-ridden by a human user with specific domain knowledge;
   aggregating two or more contiguous events having the same event pattern into a consolidated event;
   analyzing said anomaly events utilizing automatically identified and/or user identified causal relationships between said plurality of networked components for identifying one or more root cause metrics, system call sequences, and/or log entries, and associated components;
   extracting one or more patterns from said system call trace data to develop a list of affected functions to be reported to a user;
   utilizing an identified anomaly pattern to trigger autofix functions, where said autofix functions correct said one or more anomalies associated with an identified anomaly pattern; and
   reporting autofix actions, and providing predictions and recommendations for additional corrective action to a system user.

9. The method of claim 8, further comprising detecting an identified event system condition that characterizes a previously known or unknown identified anomaly pattern, where the event system condition may be edited.

10. The method of claim 8, further comprising discovery of one or more anomaly events where said discovered anomaly events are cascading events spanning different types of components.

11. The method of claim 8, further comprising aggregating two or more contiguous events having the same event pattern into a consolidated event.

12. The method of claim 11, further comprising creating frequent episode feature vectors and word frequency vectors for each log entry.

13. The method of claim 8, further comprising extracting log event patterns from received log data and constructing a feature vector for each log entry.

14. The method of claim 8, further comprising extracting one or more patterns from said system call trace data to identify a ranked list of affected functions and/or a ranked list of predicted functions that will be affected by each event, said lists to be reported to a user.

* * * * *